United States Patent Office 3,084,169
Patented Apr. 2, 1963

3,084,169
STORAGE-STABLE 3,4-DIHYDRO-1,2-PYRAN-2-CARBOXALDEHYDE
Robert W. Fourie, South Norwalk, Conn., and Glen D. Lichtenwalter and Gregor H. Riesser, Pasadena, Tex., assignors to Shell Oil Company, New York, N.Y., a corporation of Delaware
No Drawing. Filed Oct. 17, 1960, Ser. No. 62,853
7 Claims. (Cl. 260—345.9)

This invention relates to an improved method for stabilizing 3,4-dihydro-1,2-pyran-2-carboxaldehyde against polymerization. It also deals with novel stabilized compositions containing this compound which is usually sold under the name acrolein dimer—and will be so referred to, for the sake of brevity, in the following specification. Packaged acrolein dimer resistant to loss during transportation and storage is another important feature of the invention.

The polymerization which takes place during storage and use of acrolein dimer has been a handicap in many of its applications. The bulk of the polymer so formed can be readily depolymerized to acrolein dimer by heating under controlled conditions but this extra treatment adds to the cost of use of the dimer and the formation of the polymer, especially the solid form, causes difficulties in handling which are not encountered with the simple acrolein dimer. A part of the polymer formed cannot be reconverted to acrolein dimer in this way. It is apparently formed by a different reaction mechanism and results in a significant loss of acrolein dimer, further increasing the expense in use of the dimer.

A number of different methods have been suggested for retarding the polymerization of acrolein dimer during storage transportation and use. Phenolic antioxidants are widely used but are only partly effective and cannot prevent the gradual increase in viscosity and eventual conversion to solid polymer which takes place under normal conditions of storage of acrolein dimer. Fountain-Sharp patent, U.S. 2,537,579 claims a better method of retarding the acrolein dimer polymerization which takes place even in the presence of phenolic antioxidants. Small amounts of acidic materials are used as the stabilizers in the claimed method. Tannic acid is an excellent stabilizer of this type whose use is claimed in Whetstone patent, U.S. 2,514,668. Although these methods represent a substantial improvement over previous practice, they do not suppress, as completely as would be desirable, all polymerization of acrolein dimer during storage, transportation and handling. In particular they do not prevent a significant loss of the acrolein dimer through polymerization to polymer which does not revert to dimer by heating at temperatures up to about the boiling point of the dimer or slightly higher. Formation of this undesirable irrevertible polymer is accelerated by the metals commonly used in fabricating containers and this adds to the problem of storage and shipment of this compound.

An important object of the present invention is to minimize or avoid the foregoing difficulties heretofore encountered in the handling of acrolein dimer. Another object is to provide a method whereby acrolein dimer can be stabilized against loss through polymerization during storage, shipment and use. Still another object is the provision of an acrolein dimer package containing acrolein dimer in a form which is substantially completely resistant to loss through formation of irrevertible polymer while therein. A special object is the storage and shipment of acrolein dimer in metal containers without acrolein dimer polymerization. Still other objects and advantages of the invention will be apparent from the following non-limiting description of some of the more advantageous ways in which this can be successfully carried out.

In accordance with the invention acrolein dimer is stabilized against polymerization by admixture with an anhydrous alcohol at a pH of about 4.5 to about 8.0. With acrolein dimer of normal purity no adjustment of pH is required in order to maintain the pH of the solution at the required value. It may be necessary, however, in special cases to neutralize or otherwise remove acid impurities which would promote addition of the alcohol to the double bond of the acrolein dimer and/or other undesirable changes of the types disclosed in Whetstone patents, U.S. 2,640,815 and U.S. 2,766,259 for example. Mixtures in which the mole ratio of alcohol to acrolein dimer is at least about 0.33:1 can be used but those in which this ratio is at least about 0.75:1 are generally more suitable. Most preferably solutions containing about 0.9:1 to about 1.1:1 moles of acrolein dimer per mole of alcohol are used in which the dimer is substantially in the hemi-acetal form. Mixtures in which the mole ratio of alcohol to acrolein dimer is 3:1 or higher can also be used but there is generally no advantage in ratios higher than about 1.25 to 1 and shipping costs are increased thereby. The new solutions remain clear and colorless during long periods of storage in iron or steel containers which promote polymerization of the acrolein dimer. They are especially effective in reducing loss of the dimer by conversion to the irrevertible polymer.

As previously indicated it is advantageous to use the new compositions of the invention in which sufficient alcohol is employed to substantially completely convert the acrolein dimer to the hemi-acetal of the alcohol or alcohol mixture employed, since the dimer is most effectively stabilized in this way. The presence of the hemi-acetal does not interfere with most applications of the dimer, especially those carried out in aqueous media in which hydrolysis can occur. As a result the stable alcohol solutions of acrolein dimer can usually be used directly for reaction as an intermediate in manufacture of many derivatives, or in other uses of this compound. However, where the presence of the alcohol interferes with the desired reaction of the acrolein dimer or is otherwise disadvantageous in the intended use of the dimer, it can be readily removed and the dimer can be substantially completely recovered by distillation, for example.

For ease in separating the alcohol from the acrolein dimer it is advantageous to use one which is lower boiling than the dimer in making the stabilized compositions. Saturated aliphatic monohydric alcohols of 1 to 5 carbon atoms per molecule, such, for instance, as methanol, ethanol, normal and isopropanols, and the primary, secondary and tertiary butanols and pentanols, are especially suitable on this account. Higher boiling alcohols are also useful solvents for use according to the invention especially where the alcohol need not be removed prior to reaction or other intended application of the dimer. Useful higher boiling saturated aliphatic, monohydric alcohols are the normally liquid hexanols, octanols and decanols, for example.

Instead of the foregoing preferred normally liquid, saturated aliphatic, monohydric alcohols of 1 to 10 carbon atoms per molecule, one can also employ other alcohols having one or more hydroxyl groups as the solvent. As a general rule these alcohols are more expensive and offer no compensating advantage over the preferred alcohol solvents for acrolein dimer. Typical of these other useful solvents are, for instance, aliphatic unsaturated alcohols such as allyl alcohol, crotyl alcohol, the hexenyl alcohols, linalool and geraniol. Cyclic alcohols, whether alicyclic, aromatic or heterocyclic are another subgroup of solvents of this type. Useful members include, cyclohexanol, cyclohexen-2-ol, cyclohexylcarbinol, terpineol, benzyl alcohol, meta-tolylcarbinol, cinnamyl alcohol, furfuryl alcohol and the like. Examples of polyhydric alcohols which can be used instead of the foregoing monohydric alcohols, are ethylene glycol, propylene glycol, trimethylene glycol, diethylene glycol, glycerol and the like.

Unsubstituted alcohols have been emphasized in the foregoing examples of alcohols which are suitable for use in the invention because these are generally less expensive than the substituted alcohols. It is entirely feasible, however, to use alcohols which contain substituents which are unreactive under the conditions to which the acrolein dimer solutions are to be subjected. Ether, ketone, ester and halogen are examples of such unreactive substituents which may be present in the alcohol solvent employed in the invention. Thus one can use ethylene glycol monoethyl ether, diacetone alcohol, ethylene glycol monoacetate, glycerol mono- and di-chlorohydrins, etc.

Under special circumstances it may be desirable to use alcohols which are solid at room temperature, in stabilizing acrolein dimer according to the invention. In such cases it is generally preferable to use a low melting alcohol and to dissolve the acrolein dimer in the molten alcohol. The resulting acrolein dimer solution can then be stored and shipped as a stable solid which is usually most conveniently reacted or applied after remelting. In this modification of the invention one can successfully use as the acrolein dimer solvent such alcohols as lauryl alcohol, cetyl alcohol, menthol, cinnamyl alcohol, anisic alcohol, pinacol, diisopropyl glycol and the like. Even higher melting alcohols such, for instance, as pentaerythritol, etc., can also be used but as a general rule it is most advantageous to use alcohols which provide liquid solutions of acrolein dimer in the process of the invention. Most preferably secondary or tertiary monohydric alcohols are used because these have less tendency to react with the ethylenic bond of the acrolein dimer. Secondary alcohols are especially advantageous because of the greater ease with which they form the desired hemi-acetals of acrolein dimer.

Whatever the alcohol used as solvent, it is important that the alcohol solution of acrolein dimer be maintained essentially anhydrous since polymerization of the dimer is catalyzed by small amounts of water.

It has been found that these solutions can be successfully shipped and stored in drums of steel or aluminum in which the acrolein dimer would normally be subject to accelerated polymerization with resulting loss of valuable dimer. The stabilized solutions for packaging in this way can be prepared in any suitable manner it being only necessary to have the alcohol and acrolein dimer in intimate contact in the required proportions and in the pH range previously pointed out. A plurality of different alcohols can be used instead of a single alcohol and any of the known acrolein dimer stabilizers or mixtures thereof can be incorporated into the alcohol solution.

The following examples further illustrate the invention and show some of its advantages.

*Example I.—Stabilization With Isopropyl Alcohol*

Acrolein dimer was dissolved in anhydrous isopropyl alcohol in the proportion of 1.01 moles of dimer per mole of alcohol. After an initial heat of reaction as the result of hemi-acetal formation, the solution had a pH of about 5.5 and was slightly viscous but not excessively so. The solution was allowed to stand for seven months in a clear, soft glass bottle, during which time there was no observable change in the solution characteristics. The solution remained clear and colorless. The solution was analyzed for acrolein dimer content and for irreversible polymer. The following values were obtained:

|  | Percent |
|---|---|
| Recoverable acrolein dimer | 94.5 |
| Irreversible polymer per month (based on acrolein dimer content) | 0.9 |

Under the same storage condition, the same acrolein dimer formed irreversible polymer at an average rate of 2% to 3% per month and was only 79% recoverable after seven months' storage.

Proportions of isopropyl alcohol which are too low are ineffective for the stabilization and may even promote formation of the undesired irreversible polymer. Thus in tests carried out identically with the foregoing but using mole ratios of isopropyl alcohol to acrolein dimer of 0.25:1 and 0.125:1 the rates of irreversible polymer formation per month based on acrolein dimer, were respectively 2.5% or approximately the same as without the alcohol, and 4.9% or about twice that of the control test.

Acrolein dimer solutions in isopropyl alcohol prepared as above with a mole ratio of dimer to alcohol of 1.01 to 1 stored in steel drums are effectively stabilized by the alcohol during long periods of storage.

*Example II.—Stabilization With Methanol*

A solution of the same acrolein dimer as was used in Example I was prepared by dissolving the dimer in methanol. The solution had a pH of about 5.5 and contained 0.93 mole of acrolein dimer per mole of alcohol. After seven months' storage in the same way during which there was no noticeable change in the appearance or pH of the solution, determination of the irreversible polymer content showed that the rate of formation of this polymer was about 1.4% per month or less than half of that of the acrolein dimer stored under the same conditions without alcohol.

Acrolein dimer solution made in the same way and stored in an aluminum drum is equally stable.

*Example III.—Stabilization With Tertiary Butyl Alcohol*

A solution of acrolein dimer in tertiary butyl alcohol prepared by the method of Example I and stored in a mild steel drum was equally stable to irreversible polymer formation during long storage.

While drum storage of the alcohol solutions of acrolein dimer have been emphasized in the foregoing examples of the stabilized packaged dimer of the invention, it will be understood that the invention is not limited thereto since equally good results can be obtained in long storage of the dimer in tanks, tank cars or other containers. It is a further advantage of the invention that in such storage the plugging of tank outlets and of lines and pumps, etc., in contact with the stabilized solutions is avoided so that handling of the acrolein dimer is made simpler and more economical. It will thus be seen that the invention offers many advantages and is capable of wide variation.

We claim as our invention:

1. In the storage of acrolein dimer the method of reducing the formation of polymer which does not revert to acrolein dimer on heating to about 100° C., which comprises adding to the acrolein dimer a normally liquid aliphatic alcohol in which the only reactive substituent is the hydroxyl group miscible therewith in a mole ratio of about 0.75:1 to about 3:1 and maintaining the mixture essentially anhydrous and at a pH within the range of about 4.5 to about 8.0.

2. A method in accordance with claim 1 wherein the alcohol is a tertiary alcohol of 4 to 5 carbon atoms.

3. A method of stabilizing acrolein dimer against polymerization which comprises maintaining at a pH between about 4.5 and about 8.0 an anhydrous mixture of the acrolein dimer with a sufficient amount of an aliphatic alcohol of 1 to 10 carbon atoms per molecule in which the only reactive substituent is a hydroxyl group to form the hemi-acetal of acrolein dimer.

4. Acrolein dimer stabilized against polymerization during storage containing an essentially anhydrous mixture of an aliphatic alcohol of from 1 to 10 carbon atoms in which the only reactive substituent is hydroxyl, in a mole ratio of at least about 0.33:1 and having a pH of about 4.5 to about 8.0.

5. Acrolein dimer stabilized as in claim 4 wherein the alcohol is a normally liquid saturated secondary alcohol present in a mole ratio of about 0.9:1 to about 1.1:1.

6. An essentially anhydrous stabilized mixture of acrolein dimer and isopropyl alcohol in a mole ratio of about 0.75:1 to about 3:1 and having a pH of about 4.5 to about 8.0.

7. Essentially anhydrous acrolein dimer stabilized against polymerization with a sufficient amount of an unsubstituted saturated aliphatic alcohol to form the hemiacetal of acrolein dimer and at a pH between about 4.5 and about 8.0.

References Cited in the file of this patent
UNITED STATES PATENTS

| | | |
|---|---|---|
| 2,577,445 | Bortnick | Dec. 4, 1951 |
| 2,766,259 | Whetstone | Oct. 9, 1956 |
| 2,878,294 | Kress | Mar. 17, 1959 |